United States Patent [19]

Ravet et al.

[11] Patent Number: 5,145,902

[45] Date of Patent: Sep. 8, 1992

[54] APPLICATION TO AQUEOUS CALCIUM CARBONATE PIGMENT SUSPENSIONS OF A POLYCARBOXYLIC AGENT WITH PHOSPHORIC OR PHOSPHONIC GROUPS WHICH INHIBIT THE SHOCK EFFECT CAUSED BY THE INTRODUCTION OF AN ELECTROLYTE AT HIGH CONCENTRATION

[75] Inventors: Georges Ravet, Saint-Genis-Les-Ollieres; Jacques Mongoin, Champagne Au Mont D'Or; Jean-Marc Suau, Lyons, all of France

[73] Assignee: Coatex S.A., Caluire, France

[21] Appl. No.: 561,004

[22] Filed: Aug. 1, 1990

[30] Foreign Application Priority Data

Aug. 4, 1989 [FR] France .................. 89 10745

[51] Int. Cl.$^5$ .................. C08J 3/00; C08K 3/26; C08L 41/00; C08F 30/02
[52] U.S. Cl. .................. 524/425; 524/427; 524/547; 524/807; 526/278
[58] Field of Search .............. 524/425, 427, 547, 807; 526/278

[56] References Cited

U.S. PATENT DOCUMENTS 3,684,779  8/1972  Rapko .................. 260/78.5
4,842,651  6/1989  Ravet et al. .................. 106/487

FOREIGN PATENT DOCUMENTS 0366569  5/1990  European Pat. Off. .
8813511  2/1990  France .
2637511  4/1990  France .
60-28818  6/1985  Japan .

88/02382  4/1988  World Int. Prop. O. .

Primary Examiner—Paul R. Michl
Assistant Examiner—Patrick Niland
Attorney, Agent, or Firm—Oblon, Spivak, McClelland, Maier & Neustadt

[57] ABSTRACT

The viscosity increase of aqueous calcium carbonate pigment suspensions having high concentrations of dry substance is prevented by adding as a compatibility, dispersing, and/or grinding agent to an aqueous calcium carbonate suspension a copolymer of the formula:

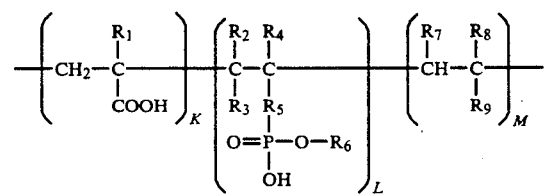

wherein $R_1$ is H or methyl, $R_2$ and $R_3$ is H, $C_{1-4}$ alkyl or a carboxylic acid group, $R_4$ is H or $C_{1-4}$ alkyl, $R_5$ is a bridging group, $R_6$ is H, a cation, an amino group, $C_{1-3}$ alkyl, $C_{1-4}$ ester or substituted amide and $R_7$ to $R_9$ each is hydrogen, a carboxylic acid containing group; K has a value between 30 and 65% by weight relative to the total weight; L has a value between 20 and 60% by weight relative to the total weight; M has a value between 10 and 45% by weight relative to the total weight; and the sum of L and M is equal to at least 35% by weight relative to the total weight, thereby preventing the shock effect when a concentrated alkaline electrolyte is added to the suspension.

25 Claims, No Drawings

APPLICATION TO AQUEOUS CALCIUM CARBONATE PIGMENT SUSPENSIONS OF A POLYCARBOXYLIC AGENT WITH PHOSPHORIC OR PHOSPHONIC GROUPS WHICH INHIBIT THE SHOCK EFFECT CAUSED BY THE INTRODUCTION OF AN ELECTROLYTE AT HIGH CONCENTRATION

BACKGROUND OF THE INVENTION

1. Field of the Invention

The present invention relates to the application to aqueous calcium carbonate suspensions at high concentration and of pigment size of a compatibility, dispersing, and/or grinding agent, which has the property of hindering the sudden and exaggerated increase of viscosity (shock effect) when an electrolyte in a concentrated form is introduced into the suspension. The invention also relates to the aqueous calcium carbonate pigment suspensions containing the selected compatibility agent, which are used in the field of papermaking and more particularly to coating of the aforesaid aqueous pigment suspensions containing the selected compatibility agent.

2. Discussion of the Background

For coating paper, those skilled in the art have long used pigment suspensions composed chiefly, first, of inorganic pigments such as kaolin, calcium carbonate, talc, titanium oxide, alone or mixed. These pigments are dispersed in an aqueous phase containing at least one binder which is dispersible in water or is water-soluble, and is of natural origin such as starch, casein, carboxymethylcellulose, and/or is a synthetic material such as a styrene-acrylate emulsion or a vinyl copolymer. Finally, the dispersion contains a dispersing agent, for example, a polyphosphate or a water-soluble carboxylic polymer.

The concentration of dry material in these pigment suspensions, particularly of calcium carbonate, has long been close to 70% by weight relative to the total weight.

During this time, since paper-coating techniques have evolved and permit increased coating speeds, it has proved advantageous for the user to utilize pigment suspensions, particularly of calcium carbonate, at higher concentration than in the past, i.e., that now have a concentration of dry substance greater than 70% by weight. Such suspensions with greater contents of inorganic pigments should permit faster coating of the paper and a reduction of the thermal energy necessary for drying, provided that they have the rheological characteristics most favorable for the coating operation, i.e., provided that they are in a state of low viscosity having a high velocity gradient to accomplish much faster coating, or they have a low viscosity at low shear rates to handle them easily, especially in the screening operations preceding the coating operation.

Most pigment suspensions, particularly those of calcium carbonate, when they are intended for coating paper, are made alkaline by introducing an alkali metal hydroxide to bring their pH to a value of at least 9, since it is known that the higher their pH is above 9, the better the stability imparted to them by the binder (the latex) introduced into the suspensions. In order not to risk lowering the high concentration of dry substance currently used for pigment suspensions intended for coating paper the alkalinity of the suspensions is increased more by adding an alkali metal hydroxide in concentrated form to the suspensions. In many cases, the addition of a concentrated hydroxide to suspensions of calcium carbonate with pigment dimensions causes an extremely rapid and large increase in their viscosity, which may go so far as to make the suspensions solid. This phenomenon, known by the expression "shock effect", occurs particularly in calcium carbonate suspensions whenever there is a combination of the conditions of high concentration of dry substance (at least 70% by weight), small particle size of the pigments (at least approximately 40% particles smaller than 1 $\mu$m), and addition of an electrolyte in concentrated form.

The absence of at least one of the aforesaid conditions limits, or even better, prevents the shock effect, but involves other disturbances such as intentionally lowering the concentration of dry substance, especially by adding a dilute electrolyte, or maintaining this concentration combined with a voluntarily more coarse pigment particle size. These are all procedures which one of skill in the art attempts to avoid.

Also, to accept the use of aqueous pigment suspensions formulated from calcium carbonate under the conditions just mentioned with reference to concentration and fineness, it would seem desirable to be able to use in the suspensions an agent which simultaneously is able to assist the grinding and dispersion of the pigment particles and to eliminate the shock effect while creating compatibility in situ. This is why the specialized literature for a number of years has reflected research done to try to eliminate this "shock effect" by suggesting dispersing and/or compatibility agents for pigment suspensions.

One such attempt is described in Japanese Patent Application 58-138161, which discloses a dispersing agent for making concentrated aqueous pigment suspensions (about 60% to 70% by weight), of precipitated calcium carbonate have a particle size of from 1 to 3 $\mu$m. This dispersing agent is a copolymer containing from about 40 to 99 mole % of a monocarboxylic ethylenic monomer, and from about 0 to 50 mole % of a dicarboxylic ethylenic monomer, and from about 1 to 10 mole % of an ethylenic monomer that has a phosphoric ester group. In this way, aqueous calcium carbonate pigment suspensions have been prepared at a concentration of 70% by weight and with an average particle size between 1 and 3 $\mu$m in the presence of the dispersing agent. However, it has not been possible to prevent "the shock effect" when a concentrated electrolyte is added, such as sodium hydroxide (at 50% concentration, for example), since a sudden and exaggerated increase of viscosity has been found.

French Patent Application No. 88 13511 discloses a compatibility agent for interpigment dispersion and grinding for aqueous pigment suspensions formulated from a mixture of inorganic pigments, at least one of which is calcium sulfate hydrate. This agent is a copolymer of the formula:

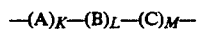

in which (A) is an ethylenic monomer with at least one carboxylic group, (B) is an ethylenic monomer having at least one phosphoric or phosphonic group, and (C) is an ethylenic monomer of the ester or substituted type in which L has a value between 5 and 95 parts by weight, with $K+L+M=100$ parts by weight, and in which K and M separately can have the value 0. However, it has been found that this agent, when used for aqueous pigment suspensions formulated from a mixture of inorganic pigments, at least one of which is calcium sulfate hydrate, with regard to highly concentrated suspensions of calcium carbonate of pigment size, does not permit in every case (but only in some cases) achieving the desired compatibility, i.e., elimination of the shock effect caused by adding an electrolyte concentrated form. A need therefore continues to exist for an improved compatibilizing agent for pigment suspensions.

SUMMARY OF THE INVENTION

Accordingly, one object of the present invention is to provide a compatibility agent that eliminates the shock effect mentioned above.

Another object of the present invention is to provide aqueous pigment suspensions of calcium-carbonate more concentrated than in the prior art, i.e suspensions that have a concentration of at least 70% by weight, prepared from very small inorganic particles, approximately 40% of which are smaller than 1 μm, that show no shock effect when a concentrated electrolyte such as an alkali metal hydroxide is added thereto.

Still another object of the invention is to provide aqueous pigment suspensions with high concentrations and small particle sizes free of the shock effect, prepared from a mixture of inorganic pigments, at least one of which is calcium carbonate.

Accordingly, these objects and other objects of the present invention as hereinafter will become more readily apparent can be attained by a method of preventing the viscosity increase of aqueous calcium carbonate pigment suspensions having high concentrations of dry substance, comprising: adding, as a compatibility, dispersing, and/or grinding agent to an aqueous calcium carbonate suspension a copolymer of the formula:

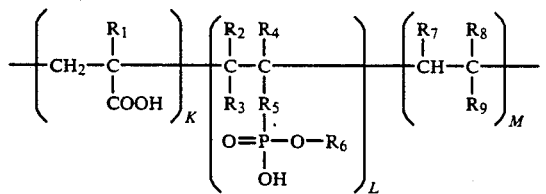

wherein $R_1$ is H or methyl, $R_2$ and $R_3$ is H, $C_{1-4}$ alkyl or a carboxylic acid group, $R_4$ is H or $C_{1-4}$ alkyl, $R_5$ is a bridging group bonding the phosphorus to the polymeric chain, $R_6$ is H, a cation, an amino group, $C_{1-3}$ alkyl, $C_{1-4}$ ester or substituted amide and $R_7$ to $R_3$ each is hydrogen, a carboxylic acid containing group; K has a value between 30 and 65% by weight relative to the total weight; L has a value between 20 and 60% by weight relative to the total weight; M has a value between 10 and 45% by weight relative to the total weight; and the sum of L and M is equal to at least 35% by weight relative to the total weight, thereby preventing the shock effect when a concentrated alkaline electrolyte is added to the suspension.

DETAILED DESCRIPTION OF THE PREFERRED EMBODIMENTS

French Patent Application No. 88 13511 describes a compatibility, dispersing, and/or grinding agent for aqueous pigment suspensions formulated from a mixture of inorganic pigments, at least one of which is calcium sulfate hydrate, to eliminate the thickening effect caused by the simultaneous presence of this pigment with other pigments such as kaolin, titanium oxide, calcium carbonate, or others. However, experience shows that the use of this agent does not systematically eliminate the shock effect resulting from introduction of a concentrated electrolyte into a concentrated aqueous pigment suspension of calcium carbonate. However, it has now been discovered that when a specific copolymer is selected from the family of copolymers disclosed in French Patent Application No. 88 13511 with regard to the monomer components which make up the copolymer and their relative quantities, the shock effect disappears, since the selected agent has the ability to prevent the increase of viscosity of calcium carbonate pigment suspensions when concentrated electrolyte is introduced into the medium. Also the agent is compatible with the suspension and is effective as a grinding agent. Furthermore, while the prior art suggests making aqueous suspensions of calcium carbonate of pigment dimensions at concentrations of about 70% by weight at the most, in the present invention the selected copolymer permits the simultaneous increase of the concentrations of dry substance in the suspensions well above this threshold, and on reduction of the average size of the pigment particles present (approximately 40% of the particles smaller than 1 μm), while eliminating the shock effect caused by the introduction of a concentrated electrolyte while controlling the rheology of pigment suspensions intended for coating paper.

In the formula above, $R_1$ can be hydrogen or a $CH_3$ group, $R_2$ or $R_3$ can by hydrogen or a $C_1$ to $C_4$ alkyl group, preferably $C_1$ to $C_3$ alkyl, or a carboxylic acid group, $R_4$ can be hydrogen and a $C_1$ to $C_4$ alkyl group, and $R_5$ is a group of atoms bonding the phosphorus to the polymeric chain through a phosphate group

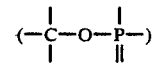

or through a phosphonate group

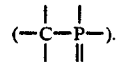

When a phosphate group is presented in the copolymer, $R_5$ can be (i) a carboxylic ester of ethylene oxide or of propylene oxide of the formula:

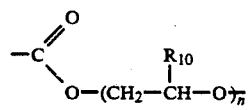

in which $R_{10}$ can be hydrogen or a methyl group and n can have values in the range of 1 to 50, preferably 1 to 10; (ii) an alkyl, aryl, or alkaryl carboxylic ester of the formula:

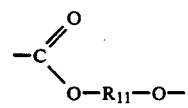

in which $R_{11}$ can have from 1 to 12 carbon atoms; (iii) a substituted amide of the formula:

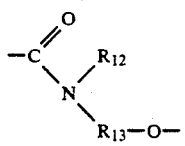

in which $R_{12}$ is hydrogen or $C_1$ to $C_4$ alkyl group, and $R_{13}$ can be a $C_1$ to $C_4$ alkyl group; or (iv) oxygen.

When a phosphonate group is present, $R_5$ can be a $C_1$ to $C_4$ alkyl group, a $C_1$ to $C_{12}$, preferably $C_1$ to $C_3$ ester, or a substituted amide; $R_6$ can be hydrogen, a cation, an amine, a $C_1$ to $C_3$ alkyl group, a $C_1$ to $C_4$ ester, or a substituted amide; and $R_7$, $R_8$, and $R_9$ can be hydrogen or a group with a carboxylic acid group.

The present acidic copolymers can be prepared by copolymerization of monomers by known procedures in the presence of suitable initiators and regulators, in aqueous, alcohol, aqueous alcohol, aromatic, aliphatic media or in a halogenated solvent, of at least one monocarboxylic ethylenic monomer (A), at least one phosphoric or phosphonic ethylenic monomer (B), and at least one dicarboxylic ethylenic monomer (C) at atmospheric pressure or under pressure. The polymerization medium can be water, methanol, ethanol, propanol, isopropanol, the butanols, or dimethylformamide, dimethyl sulfoxide, tetrahydrofuran, acetone, methyl ethyl ketone, ethyl acetate, butyl acetate, hexane, heptane, benzene, toluene, ethylbenzene, xylene, mercaptoethanol, tertio-dodecyl mercaptan, thioglycolic acid and its esters, n-dodecylmercaptan, acetic acid, tartaric acid, lactic acid, citric acid, gluconic acid, glucoheptonic acid, 2-mercaptopropionic acid, thiodiethanol, halogenated solvents such as carbon tetrachloride, chloroform, dichloromethane, or the ethers of monopropylene glycol or diethylene glycol.

The selected copolymer of the present invention which is to be used as a compatibility, dispersing, and/or grinding agent is usually chosen from those that have a specific viscosity between 0.35 and 0.85, preferably between 0.40 and 0.70. The specific viscosity of the present copolymer, which is symbolized by the letter "$\eta$", is determined as follows: A solution of copolymer in the form of its sodium salt is prepared by dissolving 50 g of the dry copolymer in one liter of a solution of distilled water containing 60 g of sodium chloride. The flow time of a given volume of this solution containing the alkali metal copolymer is then measured with a capillary viscosimeter placed in a controlled-temperature bath at 25° C., as well as the flow time of the same volume of aqueous sodium chloride solution that does not contain the said copolymer. It is then possible to define the specific viscosity $\eta$ by the following equation:

$$\eta = \frac{\text{(flow time of copolymer solution)} - \text{(flow time of NaCl solution)}}{\text{(flow time of NaCl solution)}}$$

The capillary tube is usually chosen so that the flow time of the NaCl solution with no copolymer is about 90 to 100 seconds, thus giving measurements of specific viscosity with very good precision.

After the polymerization is complete, the acidic copolymer which is formed can be collected in the form of an aqueous solution.

The copolymer of the present invention in an aqueous solution is then completely or partly neutralized by a monovalent neutralizing agent. Nevertheless, a neutralizing agent that has a polyvalent function may be combined with this monovalent agent.

In the case of a monovalent neutralizing agent, those containing an alkali metal cation or the like, particularly lithium, sodium, or potassium are preferred. This agent, can be combined with a base containing an alkaline earth metal ion or the like such as preferably calcium or magnesium, if desired.

In practice, the liquid phase resulting from the copolymerization and containing the acidic copolymer can be used as a compatibility agent in the salt form, but it can also be dried by any known method to obtain the copolymer in the form of a fine powder, and it can be used in this other form as a compatibility, dispersing, or grinding agent.

An aqueous pigment suspension containing calcium carbonate and containing a compatibility agent can be prepared by the following method:

a) A preparation is carried out by slurring calcium carbonate in water. All or a portion of the compatibility agent of the invention is added to the aqueous phase, then the inorganic material, to obtain a fluid and desirably homogeneous suspension.

b) The suspension obtained is added continuously into a grinding zone which employs a ball mill.

c) The temperature of the suspension during the grinding is kept below 100° C., preferably between room temperature and 80° C.

d) The suspension to be ground is mixed in the presence of balls for the time necessary to obtain the desired particle size.

e) Supplemental amounts of the compatibility agent may be introduced during the grinding one or more times.

f) At the outlet of the grinder, the suspension of finely ground calcium carbonate is separated continuously from the grinding materials and the particles rejected because they are too coarse.

g) An alkaline electrolyte is added to the finely ground suspension in concentrated form before or after possibly formulating it for paper coating by adding various agents traditionally used, and also at least one other type of pigment.

Usually, the electrolyte added to the suspension is a water-soluble alkali metal hydroxide, more particularly sodium or potassium hydroxide.

If the pigment(s) used has a particle size distribution from the outset that meets the needs of the user, only steps (a) and (g) are carried out. Otherwise, the following steps are carried out, i.e., (b) to (g) to produce an aqueous suspension of pigments made fine by grinding and made compatible with the concentrated electrolyte introduced into the suspension in the last step.

The compatibility agent of the present invention is added to the aqueous pigment suspension in an amount of 0.05 to 4% by weight of active substance relative to the dry weight of the inorganic materials, preferably in an amount of 0.5 to 2.0%.

The suspension collected after slurring and/or grinding usually has a concentration of dry substance of at least 70%, preferably in the range of 74 to 80% by weight, with the dimensions of the pigment particles obtained being defined by the user in the case of grinding.

The refined calcium carbonate pigment suspension, alone or combined with other pigments as described above in step (g) such as kaolin, talc, titanium oxide, or others, whose rheological characteristics have been stabilized as a result of the implementation of the technique of the present invention which employs the compatability agent, can then beneficially be used as pigment filler for coating paper.

Having now generally described this invention, a further understanding can be obtained by reference to certain specific examples which are provided herein for purposes of illustration only and are not intended to be limiting unless otherwise specified.

EXAMPLE 1

The following illustrates the art known method of preparing suspensions of calcium carbonate by slurring. To this end, several suspensions of calcium carbonate originating from deposits in Orgon, France were prepared with 20 types of agents known for their dispersing action and/or assistance in grinding, as described in the prior art. The mean diameter of the calcium carbonate before grinding was 40 microns. These tests were made according to the same experimental criteria by carrying out the grinding in the same equipment so that the results obtained can be compared.

For each test, a suspension of calcium carbonate was prepared at a concentration of 76% dry substance, expressed in percent by weight.

The grinding agent was present in the suspensions in the amount of 1% by weight of dry substance relative to the weight of the calcium carbonate to be ground. Each suspension thus prepared was placed in a grinder of the Dyno-Mill type with stationary cylinder and rotating impeller whose grinding material was composed of corundum balls having a diameter in the range of 0.6 mm to 1.0 mm. The total volume occupied by the grinding material was 1,200 ml, while its weight was 2.9 kg. The grinding chamber had a volume of 2,500 ml. The circumferential velocity of the grinder was 10 meters per second. The suspension of calcium carbonate was recycled at a rate of 18 liters per hour.

The discharge of the Dyno-Mill grinder was equipped with a separator of 300 micron mesh, which permits the suspension resulting from the grinding to be separated from the grinding material. The temperature during each grinding test was kept between 60° C. and 70° C. Then, twenty-four hours after grinding, the viscosity of the microparticulate suspension was measured with a Brookfield viscosimeter at a temperature of 20° C. and with a speed of rotation of 100 rpm. In the same way, after grinding, the particle size distribution was determined by means of a Sedigraph 5100 granulometer from the MICROMERITICS Company.

The refined suspensions were then cooled to room temperature and the alkali metal electrolyte was added with stirring (sodium hydroxide) to test the ability of the suspensions to resist the effect of ionic shock traditionally caused by this addition.

All of the characteristics of the dispersing and/or grinding agent (monomer composition, its specific viscosity, and the neutralizing ion(s)), and those of the refined suspensions (content of dry substance, Brookfield viscosities in centipoises after 24 hours, before and after adding 50% sodium hydroxide in an amount of 0.8% by weight dry/dry, and their behavior after this addition graded from 0 to 5)are shown in Table 1 below (tests 1 to 20).

TABLE 1

| | PRIOR ART | | | | | | | |
|---|---|---|---|---|---|---|---|---|
| | CHARACTERISTICS OF AGENT | | | CHARACTERISTICS OF REFINED SUSPENSION | | | | |
| | | | | | GRANULO | VISCOSITY AFTER 24 H | | |
| TEST NO. | COMPOSITION | SPECIFIC VISCOSITY | NEUTRAL IONS | M.S. % | % <1 MICRON | BEFORE 100 T | AFTER ADDN. 10 T | 100 T APPR |
| 1 | 100 AA | 0.54 | 100 Na | 76 | 60 | 850 | solidified | 0 |
| 2 | 100 AA | 0.54 | 50 Na 50 Mg | 76 | 60 | 640 | solidified | 0 |
| 3 | 100 AA | 0.54 | 70 Na 30 Ca | 76 | 60 | 730 | solidified | 0 |
| 4 | 100 AA | 0.54 | 100 NH4 | 76 | 58 | 530 | 3400 | 850 0— |
| 5 | PO4TSP 18OE | | | 76 | 60 | 290 | solidified | 0 |
| 6 | 30 AA 70 AM | 0.5 | 100 Na | 76 | 51 | 1100 | solidified | 0 |
| 7 | 50 AA 50 AEG | 0.4 | 100 Na | 76 | 56 | 4850 | solidified | 0 |
| 8 | 75 AA 22 AITC | 0.4 | 100 Na | 76 | 56 | 590 | 88000 | 30400 0 |
| 9 | 60 AA 40 PO4 MAEG | 0.6 | 100 Na | 76 | 47 | 280 | 89000 | 10000 0 |
| 10 | 57 AA 25 AAM 18 PO4 MAEG | 0.7 | 100 Na | 76 | 48 | 350 | 80000 | 14400 0 |
| 11 | 30 AA 30 MAM 40 PO4 MAEG | 0.53 | 100 Na | 76 | 47 | 420 | solidified | 0 |
| 12 | 90 AA 5 AITC 5 PO4 MAEG | 0.5 | 100 Na | 76 | 56 | 290 | 120000 | 20000 0 |
| 13 | 90 AA 5 AITC 5 PO4 MAEG | 0.5 | 100 NH4 | 76 | 56 | 340 | 46000 | 5700 0— |
| 14 | 80 AA 10 AITC 10 PO4 MAEG | 0.5 | 100 Na | 76 | 46 | 430 | 75000 | 8150 0 |
| 15 | 75 AA 10 AITC | 0.46 | 100 Na | 76 | 55 | 680 | 300000 | 100000 0 |

TABLE 1-continued

| | | | | | | | | | |
|---|---|---|---|---|---|---|---|---|---|
| 16 | 15 PO4 MAEG<br>75 AA<br>15 AITC | 0.41 | 100 Na | 76 | 60 | 890 | 92000 | 15200 | 0 |
| 17 | 10 PO4 MAEG<br>75 AA<br>5 AITC | 0.46 | 100 Na | 76 | 54 | 385 | 400000 | 200000 | 0 |
| 18 | 20 PO4 MAEG<br>60 AA<br>30 AITC | 0.4 | 100 Na | 76 | 52 | 355 | 100000 | 11200 | 0 |
| 19 | 10 PO4 MAEG<br>60 AA<br>30 AITC | 0.4 | 100 NH4 | 76 | 49 | 420 | 1500 | 580 | 0— |
| 20 | 10 PO4 MAEG<br>70 AA<br>10 AITC<br>20 PO4 MAEG | 0.47 | 100 Na | 76 | 52 | 235 | 102000 | 8800 | 0 |

AA = Acrylic acid
AM = Methacrylic acid
AAM = Acrylamide
AEG = Ethylene glycol acrylate
AITC = Itaconic acid
ANMA = Maleic anhydride
APP = Propenephosphonic acid
AAPP = Acrylamidomethylpropenephosphonic acid
PO4MAEG = Ethylene glycol methacrylate phosphate
PO4AEG = Ethylene glycol acrylate phosphate
PO4TSP18OE = Tristyrylphenol18EO phosphate
PO4AL = Allylphosphate
MAM = Methyl methacrylate
Na = Sodium ion
Ca = Calcium ion
Mg = Magnesium ion
K = Potassium ion
Li = Lithium ion
TEA = Triethanolamine
NH4 = Ammonium Ion
0— = Not usable, evolution of ammonia
MS = Dry substance
GRANULO = Particle size distribution
NEUTRAL = Neutralization
NOTATION
0 = Very poor
1 = Poor
2 = Mediocre
3 = Average
4 = Good
5 = Very good (i) From the data above, the following is established concerning the dispersing and/or grinding agents known in the art.

(i) In tests 1 to 5, homopolymers of acrylic acid or an ethoxylated organic phosphate, are employed.

(ii) In tests 6 to 9, ethylenic copolymers comprising acrylic acid and methacrylic acid, or a hydroxylated acrylic monomer (AEG), or a dicarboxylic ethylenic monomer (AITC), or a phosphoric ethylenic acid (PO MAEG) are employed.

(iii) In tests 10 to 20, terpolymers of acrylic acid, the phosphate of ethylene glycol methacrylate, and an amide (acrylamide), or an acrylic ester (MAM), or a dicarboxylic monomer (AITC) are employed.

(iv) None of the suspensions shows an ability to resist the shock effect, which is the sudden great increase of viscosity caused by the addition of the concentrated sodium hydroxide electrolyte.

(v) However, tests 4, 13, and 19, although they give relatively good results, cannot be employed industrially because of the severe emission of ammonia during the preparation of the coating color and its application to paper.

EXAMPLE 2

The following is an embodiment of the present invention which shows the effect of levels of phosphoric acid units, as it relates to the grinding of calcium carbonate in the presence of the compatibility, dispersing, and/or grinding agent of the invention. Each agent shown in Table 2 is comprised of three monomers for which L can have values of from 20 to 60 according to the invention, while K can have values between 10 and 65, and M can have values between 10 and 30. During tests 21 to 29, it was possible to modify the formula of the copolymer by varying the various groups quantitatively, as well as the specific viscosities of the copolymers used, with the understanding that the copolymers were completely neutralized to a pH between 8 and 9 by means of sodium hydroxide. The grinding was carried out by the method described in Example I, using the same starting materials and retaining the same operating parameters.

After the grinding, the aqueous calcium carbonate suspensions were cooled to room temperature and the concentrated electrolyte (50% sodium hydroxide) was added with stirring in an amount of 0.8% by weight dry/dry.

All of the characteristics of the compatibility, dispersing, and/or grinding agent (monomer composition, specific viscosity, and neutralizing ion(s)), and of the refined suspensions (content of dry substance, Brookfield viscosities in centipoises after 24 hours, before and after adding 50% sodium hydroxide in an amount of 0.8% by weight dry/dry, and their behavior after this addition, graded from 0 to 5) are shown in Table 2 below (tests 21 to 29).

shock effect resulting from addition of concentrated electrolyte, while still retaining adequate grinding

TABLE 2

EFFECT OF PROPORTION OF PHOSPHORIC UNIT

| TEST NO. | CHARACTERISTICS OF AGENT | | | CHARACTERISTICS OF REFINED SUSPENSION | | | | | |
|---|---|---|---|---|---|---|---|---|---|
| | COMPOSITION | SPECIFIC VISCOSITY | NEUTRAL IONS | M.S. % | GRANULO % <1 MICRON | VISCOSITY AFTER 24 H | | | |
| | | | | | | BEFORE 100 T | AFTER ADDN. 10 T | 100 T | GRADE |
| 21 | 65 AA<br>15 AITC<br>20 PO4 MAEG | 0.49 | 100 Na | 76 | 51 | 455 | 24000 | 3150 | 3 |
| 22 | 60 AA<br>15 AITC<br>25 PO4 MAEG | 0.48 | 100 Na | 76 | 54 | 480 | 20000 | 2500 | 3 |
| 23 | 60 AA<br>10 AITC<br>30 PO4 MAEG | 0.54 | 100 Na | 76 | 46 | 590 | 12000 | 1700 | 3.5 |
| 24 | 45 AA<br>20 AITC<br>35 PO4 MAEG | 0.44 | 100 Na | 76 | 47 | 315 | 11300 | 1600 | 3.5 |
| 25 | 35 AA<br>30 AITC<br>35 PO4 MAEG | 0.49 | 100 Na | 76 | 44 | 255 | 4000 | 760 | 4 |
| 26 | 35 AA<br>15 AITC<br>50 PO4 MAEG | 0.58 | 100 Na | 76 | 42 | 525 | 5300 | 770 | 4 |
| 27 | 30 AA<br>10 AITC<br>60 PO4 MAEG | 0.46 | 100 Na | 76 | 41 | 365 | 6000 | 1220 | 4 |
| 28 | 10 AA<br>30 AITC<br>60 PO4 MAEG | 0.83 | 100 Na | 76 | 30 | 325 | 6000 | 1000 | 2 |
| 29 | 10 AA<br>30 AITC<br>60 PO4 MAEG | 0.6 | 100 Na | 76 | 27 | 255 | 600 | 230 | 2 |

AA = Acrylic acid
AM = Methacrylic acid
AAM = Acrylamide
AEG = Ethylene glycol acrylate
AITC = Itaconic acid
ANMA = Maleic anhydride
APP = Propenephosphonic acid
AAPP = Acrylamidomethylpropenephosphonic acid
PO4MAEG = Ethylene glycol methacrylate phosphate
PO4AEG = Ethylene glycol acrylate phosphate
PO4TSP18OE = Tristyrylphenol18EO phosphate
PO4AL = Allylphosphate
MAM = Methyl methacrylate
Na = Sodium ion
Ca = Calcium ion
Mg = Magnesium ion
K = Potassium ion
Li = Lithium ion
TEA = Triethanolamine
NH4 = Ammonium Ion
0— = Not usable, evolution of ammonia
MS = Dry substance
GRANULO = Particle size distribution
NEUTRAL = Neutralization
NOTATION
0 = Very poor
1 = Poor
2 = Mediocre
3 = Average
4 = Good
5 = Very good From this Table 2, and by comparison with Table 1, it appears that the viscosities of the suspensions measured under the same conditions as those of Example 1, after adding sodium hydroxide in a concentrated state, are significantly lower than those of the prior art. From this fact, tests 21 to 27 show the limits of the index L of the phosphoric acid unit, which can be between 20% and 60% (grade of classification 3 to 4) combined with the index K between 30% and 65% and the index M between 10% and 45%. Thus, tests 21 to 27 show the selection that must be made for the phosphoric acid unit of the agent (L between 20% and 60%) to eliminate the shock effect resulting from addition of concentrated electrolyte, while still retaining adequate grinding power.

With regard to tests 28 and 29, they show that in spite of the presence of a quantity of phosphoric monomer compatible with the aforesaid limits, if at least one of the other monomers (in this case A) is outside of the limits of the invention, it is not possible simultaneously to obtain a compromise between the grinding ability and the ability to resist the shock effect.

EXAMPLE 3

This example is intended to illustrate the object of the invention by selection of monomers in the claimed percentages, i.e., with K between 30% and 65% by weight, L between 20% and 60%, and M between 10% and 45% by weight. Tests 30 to 41 relate to the selection of agents made of copolymers comprising 30% to 55% acrylic acid, 10% to 40% itaconic acid, and 20% to 60% ethylene glycol methacrylate phosphate ($PO_4$ MAEG). Tests 42 to 45 relate to the selection of compatibility agents made of copolymers comprising 40% acrylic acid, 30% itaconic acid, and various phosphoric monomers (phosphate or phosphonate) in a proportion of 30%. Test 46 relates to the selection of an agent mad=of a copolymer comprising 40% acrylic acid, 35% $PO_4$ MAEG, and 25% maleic anhydride. Test 47 relates to a selected agent that is a copolymer comprising 40% methacrylic acid, 30% $PO_4$ MAEG, and 30% itaconic acid. Finally, test 48 relates to the selection of an agent made of a copolymer comprising 22.5% methacrylic acid, 22.5% acrylic acid, 35% $PO_4$ MAEG, and 20% itaconic acid.

The grinding was done by the method described in Example 1, using the same starting materials and retaining the same operating parameters. After grinding, the aqueous calcium carbonate suspensions were cooled to room temperature and 50% sodium hydroxide was added with stirring in an amount of 0.8% by weight dry/dry. All of the characteristics of the compatibility, dispersing, and/or grinding agent (monomer composition, specific viscosity, and neutralizing ion(s)), and of the refined suspensions (content of dry substance, Brookfield viscosities in centipoises after 24 hours, before and after adding 50% sodium hydroxide, in an amount of 0.8% by weight dry/dry, and their behavior after this addition shown by a grade from 0 to 5) are shown in Table 3 below (tests 30 to 48).

TABLE 3

| | | | | INVENTION | | | | |
| --- | --- | --- | --- | --- | --- | --- | --- | --- |
| | CHARACTERISTICS OF AGENT | | | CHARACTERISTICS OF REFINED SUSPENSION | | | | |
| | | | | GRANULO | VISCOSITY AFTER 24 H | | | |
| TEST | | SPECIFIC | NEUTRAL | M.S. | % <1 | BEFORE | AFTER ADDN. | |
| NO. | COMPOSITION | VISCOSITY | IONS | % | MICRON | 100 T | 10 T | 100 T GRADE |
| 30 | 55 AA 10 AITC 35 PO4 MAEG | 0.62 | 100 Na | 76 | 47 | 705 | 6400 | 1120 4 |
| 31 | 50 AA 15 AITC 35 PO4 MAEG | 0.4 | 100 Na | 76 | 43 | 650 | 28000 | 3500 3.5 |
| 32 | 50 AA 30 AITC 20 PO4 MAEG | 0.49 | 100 Na | 76 | 49 | 320 | 11600 | 1920 3.5 |
| 33 | 50 AA 25 AITC 25 PO4 MAEG | 0.49 | 100 Na | 76 | 50 | 380 | 21400 | 2660 3.5 |
| 34 | 50 AA 20 AITC 30 PO4 MAEG | 0.48 | 100 Na | 76 | 46 | 320 | 15500 | 2200 3.5 |
| 35 | 45 AA 15 AITC 40 PO4 MAEG | 0.55 | 100 Na | 76 | 51.5 | 640 | 26000 | 2900 3.5 |
| 36 | 45 AA 20 AITC 35 PO4 MAEG | 0.44 | 100 Na | 76 | 47 | 315 | 11300 | 1600 4 |
| 37 | 40 AA 30 AITC 30 PO4 MAEG | 0.45 | 100 Na | 76 | 43 | 550 | 15500 | 2350 3.5 |
| 38 | 35 AA 40 AITC 25 PO4 MAEG | 0.48 | 100 Na | 76 | 41 | 400 | 13600 | 2100 3.5 |
| 39 | 35 AA 30 AITC 35 PO4 MAEG | 0.49 | 100 Na | 76 | 44 | 255 | 4000 | 760 5 |
| 40 | 30 AA 10 AITC 60 PO4 MAEG | 0.46 | 100 Na | 76 | 41 | 460 | 15000 | 1900 3.5 |
| 41 | 45 AA 20 AITC 35 PO4 MAEG | 0.5 | 100 Na | 76 | 46 | 500 | 15000 | 2160 3.5 |
| 42 | 40 AA 30 AITC 30 PO4 MAEG | 0.48 | 100 Na | 76 | 41 | 460 | 13200 | 2000 3.5 |
| 43 | 40 AA 30 AITC 30 APP | 0.52 | 100 Na | 76 | 41 | 560 | 18000 | 3100 3.5 |
| 44 | 40 AA 30 AITC 30 AAPP | 0.51 | 100 Na | 76 | 42 | 520 | 11800 | 1800 3.5 |
| 45 | 40 AA 30 AITC 30 PO4 AL | 0.55 | 100 Na | 76 | 49 | 650 | 17000 | 2820 3.5 |
| 46 | 40 AA 25 ANMA 35 PO4 MAEG | 0.52 | 100 Na | 76 | 43 | 720 | 21000 | 2950 3.5 |
| 47 | 40 AM | 0.52 | 100 Na | 76 | 40 | 620 | 14800 | 2700 3.5 |

TABLE 3-continued

|  |  |  |  |  |  |  |  |  |
|---|---|---|---|---|---|---|---|---|
| 48 | 30 AITC<br>30 PO4 MAEG<br>22.5 AM<br>22.5 AA<br>20 AITC<br>35 PO4 MAEG | 0.54 | 100 Na | 76 | 45.5 | 400 | 7200 | 1400 4 |

AA = Acrylic acid
AM = Methacrylic acid
AAM = Acrylamide
AEG = Ethylene glycol acrylate
AITC = Itaconic acid
ANMA = Maleic anhydride
APP = Propenephosphonic acid
AAPP = Acrylamidomethylpropenephosphonic acid
PO4MAEG = Ethylene glycol methacrylate phosphate
PO4AEG = Ethylene glycol acrylate phosphate
PO4TSP18OE = Tristyrylphenol18EO phosphate
PO4AL = Allylphosphate
MAM = Methyl methacrylate
Na = Sodium ion
Ca = Calcium ion
Mg = Magnesium ion
K = Potassium ion
Li = Lithium ion
TEA = Triethanolamine
NH4 = Ammonium Ion
0— = Not usable, evolution of ammonia
MS = Dry substance
GRANULO = Particle size distribution
NEUTRAL = Neutralization
NOTATION
0 = Very poor
1 = Poor
2 = Mediocre
3 = Average
4 = Good
5 = Very good From the data obtained in comparison to the data of Table 1, it appears that it is possible under the aforesaid conditions pursuant to the invention, to obtain calcium carbonate suspensions that are simultaneously of fine particle size, concentrated, and resistant to the shock effect encountered upon the addition of concentrated electrolyte to the suspension.

EXAMPLE 4

This embodiment of the invention demonstrates the effect of the specific viscosity of the compatibility, dispersing, and/or grinding agent, and relates to the application of the agent to the grinding of calcium carbonate. Within this framework, several experiments were made (tests 49 to 54) that used an agent with the same qualitative composition but with different specific viscosities for each test. The grinding was carried out by the method described in Example 1 using the same starting materials, and retaining the same operating parameters. After grinding, the aqueous calcium carbonate suspensions were cooled to room temperature, and 50% sodium hydroxide was added with stirring in an amount of 0.8% by weight dry/dry.

All of the characteristics of the compatibility, dispersing, and/or grinding agent (monomer composition, specific viscosity, and neutralizing ion(s)), and of the refined suspensions (content of dry substance, Brookfield viscosities in centipoises after 24 hours before and after adding 50% sodium hydroxide in an amount of 0.8% by weight dry/dry, and their behavior after this addition shown by a grade from 0 to 5) are shown in Table 4 below (tests 49 to 54).

TABLE 4
EFFECT OF SPECIFIC VISCOSITY

| | CHARACTERISTICS OF AGENT | | | CHARACTERISTICS OF REFINED SUSPENSION | | | | | |
|---|---|---|---|---|---|---|---|---|---|
| | | | | | GRANULO | VISCOSITY AFTER 24 H | | | |
| TEST NO. | COMPOSITION | SPECIFIC VISCOSITY | NEUTRAL IONS | M.S. % | % <1 MICRON | BEFORE 100 T | AFTER 10 T | ADDN. OUT 100 T | GRADE |
| 49 | 45 AA<br>20 AITC<br>35 PO4 MAEG | 0.3 | 100 Na | 76 | 30 | 400 | 30000 | 4000 | 2 |
| 50 | 45 AA<br>20 AITC<br>35 PO4 MAEG | 0.44 | 100 Na | 76 | 47 | 315 | 11300 | 1600 | 4 |
| 51 | 45 AA<br>20 AITC<br>35 PO4 MAEG | 0.52 | 100 Na | 76 | 50 | 470 | 10000 | 1520 | 4 |
| 52 | 45 AA<br>20 AITC<br>35 PO4 MAEG | 0.61 | 100 Na | 76 | 46 | 710 | 13400 | 1840 | 4 |
| 53 | 45 AA<br>20 AITC<br>35 PO4 MAEG | 0.8 | 100 Na | 76 | 40 | 420 | 25000 | 2900 | 3.5 |

TABLE 4-continued

| | | | | | | | | | |
|---|---|---|---|---|---|---|---|---|---|
| 54 | 45 AA<br>20 AITC<br>35 PO4 MAEG | 1 | 100 Na | 76 | 27 | 320 | 6800 | 1040 | 2 |

AA = Acrylic acid
AM = Methacrylic acid
AAM = Acrylamide
AEG = Ethylene glycol acrylate
AITC = Itaconic acid
ANMA = Maleic anhydride
APP = Propenephosphonic acid
AAPP = Acrylamidomethylpropenephosphonic acid
PO4MAEG = Ethylene glycol methacrylate phosphate
PO4AEG = Ethylene glycol acrylate phosphate
PO4TSP18OE = Tristyrylphenol18EO phosphate
PO4AL = Allylphosphate
MAM = Methyl methacrylate
Na = Sodium ion
Ca = Calcium ion
Mg = Magnesium ion
K = Potassium ion
Li = Lithium ion
TEA = Triethanolamine
NH4 = Ammonium Ion
0— = Not usable, evolution of ammonia
MS = Dry substance
GRANULO = Particle size distribution
NEUTRAL = Neutralization
NOTATION
0 = Very poor
1 = Poor
2 = Mediocre
3 = Average
4 = Good
5 = Very good A comparison of the data above with the data in Table 1 shows that the agent of the invention must have a specific viscosity above 0.3 and below 1 (classification grade 2) to lead after grinding to the production of a concentrated (76%) suspension of calcium carbonate, that on the one hand has an acceptable particle size distribution (at least 40% of the particles smaller than 1 μm), and on the other hand, that has the property of resisting the shock effect which results upon introduction of concentrated sodium hydroxide electrolyte into the suspension. Thus, it has been found that the specific viscosity of the agent in the application of the invention must be between 0.35 and 0.85, inclusive.

EXAMPLE 5

This embodiment of the invention demonstrates the effect of the neutralizing ion of the compatibility, dispersing, and/or grinding agent used in concentrated suspensions of calcium carbonate. To do this, the grinding experiments were carried out (tests 55 to 64) in the presence of the agent composed of a copolymer of the same composition and specific viscosity, but whose acidic functional groups have been neutralized (tests 55 to 63) by sodium, lithium, potassium, magnesium, calcium or ammonium ions, or by triethanolamine, used alone, or in certain mixtures, or not having been neutralized (test 64) by way of comparison. The grinding was carried out by the method described in Example 1, using the same starting materials and retaining the same operating parameters. After grinding, the aqueous calcium carbonate suspensions were cooled to room temperature and 50% sodium hydroxide was added with stirring in an amount of 0.8% by weight dry/dry.

All of the characteristics of the compatibility, dispersing, and/or grinding agent (monomer composition, specific viscosity, and neutralizing ion(s)), and of the refined suspensions (content of dry substance, Brookfield viscosities in centipoises after 24 hours, before and after adding 50% sodium hydroxide in an amount of 0.8% by weight dry/dry, and their behavior after this addition shown by a grade from 0 to 5) are shown in Table 5 below.

TABLE 5

EFFECT OF NEUTRALIZING CATION

| | CHARACTERISTICS OF AGENT | | | CHARACTERISTICS OF REFINED SUSPENSION | | | | | |
|---|---|---|---|---|---|---|---|---|---|
| | | | | GRANULO | | VISCOSITY AFTER 24 H | | | |
| TEST NO. | COMPOSITION | SPECIFIC VISCOSITY | NEUTRAL IONS | M.S. % | % <1 MICRON | BEFORE 100 T | AFTER 10 T | ADDN. OUT 100 T | GRADE |
| 55 | 45 AA<br>20 AITC<br>35 PO4 MAEG | 0.52 | 100 Na | 76 | 44 | 630 | 8400 | 1390 | 4 |
| 56 | 45 AA<br>20 AITC<br>35 PO4 MAEG | 0.52 | 100 K | 76 | 48 | 780 | 50000 | 5850 | 2.5 |
| 57 | 45 AA<br>20 AITC<br>35 PO4 MAEG | 0.52 | 100 Li | 76 | 45 | 350 | 1250 | 435 | 4 |
| 58 | 45 AA<br>20 AITC<br>35 PO4 MAEG | 0.52 | 100 Mg | 76 | Not possible<br>Does not grind | | | | 0 |

TABLE 5-continued

| | | | | | | | | | |
|---|---|---|---|---|---|---|---|---|---|
| 59 | 45 AA<br>20 AITC<br>35 PO4 MAEG | 0.52 | 100 TEA | 76 | Not possible<br>Does not grind | | | | 0 |
| 60 | 45 AA<br>20 AITC<br>35 PO4 MAEG | 0.52 | 100 NH4 | 76 | 41 | 175 | 500 | 220 | 0— |
| 61 | 45 AA<br>20 AITC<br>35 PO4 MAEG | 0.52 | 50 Ca<br>50 Na | 76 | 43 | 210 | 2350 | 555 | 4 |
| 62 | 45 AA<br>20 AITC<br>35 PO4 MAEG | 0.52 | 50 Mg<br>50 Na | 76 | 44 | 250 | 6600 | 1000 | 4 |
| 63 | 45 AA<br>20 AITC<br>35 PO4 MAEG | 0.52 | 30 Ca<br>70 Na | 76 | 49 | 580 | 20000 | 2350 | 3.5 |
| 64 | 45 AA<br>20 AITC<br>35 PO4 MAEG | 0.52 | NONE | 76 | nul | | | | 0 |

AA = Acrylic acid
AM = Methacrylic acid
AAM = Acrylamide
AEG = Ethylene glycol acrylate
AITC = Itaconic acid
ANMA = Maleic anhydride
APP = Propenephosphonic acid
AAPP = Acrylamidomethylpropenephosphonic acid
PO4MAEG = Ethylene glycol methacrylate phosphate
PO4AEG = Ethylene glycol acrylate phosphate
PO4TSP18OE = Tristyrylphenol18EO phosphate
PO4AL = Allylphosphate
MAM = Methyl methacrylate
Na = Sodium ion
Ca = Calcium ion
Mg = Magnesium ion
K = Potassium ion
Li = Lithium ion
TEA = Triethanolamine
NH4 = Ammonium Ion
0— = Not usable, evolution of ammonia
MS = Dry substance
GRANULO = Particle size distribution
NEUTRAL = Neutralization
NOTATION
0 = Very poor
1 = Poor
2 = Mediocre
3 = Average
4 = Good
5 = Very good A comparison of the data above with the data in Table 1 shows that the neutralizing ion of the acidic functional groups of the agent or the absence of neutralization of the said groups can have a great and disastrous effect on the characteristics of the suspensions (tests 58, 59, and 64), and that it must be the object of selection (tests 55, 56, 57, 61, 62, and 63), for which test 60, although giving good results, cannot be implemented industrially because of the copious emission of ammonia that occurs during the preparation of the coating color and its application to paper.

Thus, pursuant to the invention, the neutralizing ion must be selected from the monovalent group composed of lithium, sodium, and potassium, or from the divalent group, provided that it is combined in part with a monovalent ion.

EXAMPLE 6

This embodiment shows the preparation of comparative coating colors (mixture of two pigments) intended for coating paper, prepared by known processes, and making use, on the one hand, of compatibility, dispersing, and/or grinding agents belonging to the prior art (tests 1 and 4), and, on the other hand, (test 48) making use of an agent of the present invention.

Each coating color contained, in parts by weight:

| | |
|---|---|
| Calcium carbonate with at least 40% of the particles being smaller than 1 micron | 85 |
| Satin white (ethringite) | 15 |
| Latex (S 360 D sold by BASF) | 10.5 |
| Carboxymethylcellulose (Finnfix 5 sold by Metralliiton Tilisuus) | 0.5 |
| Agent of the invention or dispersing agent from the prior art | 1 |
| Sodium hydroxide (50% by weight) | 0.8 |

The concentration of dry substance was 63%.

Sodium hydroxide was added with stirring to the suspension of calcium carbonate before adding the other components. All of the characteristics of the coating colors thus prepared are shown in Table 6 below.

TABLE 6

| | CHARACTERISTICS | | | | |
|---|---|---|---|---|---|
| | Of the Agent | | | Of the Coating Slips | |
| Ground slurry with the agent | % Agent by weight | Neutralizing ion | Specific viscosity | Viscosity | |
| | | | | 10 T | 100 T |
| From test No. 4 | 1 | NH4 | 0.55 | 2800 | 580 |
| From test No. 48 | 1 | Na | 0.54 | 1000 | 280 |

TABLE 6-continued

| | CHARACTERISTICS | | | | |
|---|---|---|---|---|---|
| | Of the Agent | | | Of the Coating Slips | |
| Ground slurry with the agent | % Agent by weight | Neutralizing ion | Specific viscosity | Viscosity 10 T | 100 T |
| From test No. 1 | 1 | Na | 0.55 | solid | |

From this, it is clear that the coating color from test 4 containing the dispersing agent neutralized by ammonium ion remains fluid after the addition of sodium hydroxide, but cannot be used on an industrial scale since copious emission of ammonia occurs when concentrated sodium hydroxide is added.

The coating color from test 1 containing the dispersing agent according to the prior art became unusable because it solidified when sodium hydroxide was added.

Only the coating color from test 48 using the agent of the invention remained usable after the addition of sodium hydroxide because of the absence of shock effect and because of an entirely acceptable viscosity.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A method of preventing the viscosity increase of aqueous calcium carbonate pigment suspensions having high concentrations of dry substance, comprising:
adding as a compatibility, dispersing, and/or grinding agent to an aqueous calcium carbonate suspension a copolymer of the formula:

$$\left(-CH_2-\underset{\underset{COOH}{|}}{\overset{\overset{R_1}{|}}{C}}-\right)_K \left(\underset{\underset{\underset{OH}{|}}{\underset{O=P-O-R_6}{|}}}{\overset{\overset{R_2}{|}}{\underset{R_3}{\overset{|}{C}}}-\overset{\overset{R_4}{|}}{\underset{R_5}{\overset{|}{C}}}}\right)_L \left(\overset{\overset{R_7}{|}}{CH}-\overset{\overset{R_8}{|}}{\underset{R_9}{\overset{|}{C}}}\right)_M$$

wherein $R_4$ is H or methyl, $R_2$ and $R_3$ is H, $C_{1-4}$ alkyl or a carboxylic acid group, $R_4$ is H or $C_{1-4}$ alkyl, $R_5$ is a bridging group, $R_6$ is H, a cation, an amino group, $C_{1-3}$ alkyl, $C_{1-4}$ ester or substituted amide and $R_7$ to $R_2$ each is hydrogen, a carboxylic acid containing group; K has a value between 30 and 65% by weight relative to the total weight; L has a value between 20 and 60% by weight relative to the total weight; M has a value between 10 and 45% by weight relative to the total weight; and the sum of L and M is equal to at least 35% by weight relative to the total weight, thereby preventing the shock effect when a concentrated alkaline electrolyte is added to the suspension.

2. The method of claim 1, wherein, when the phosphorus is bonded to the polymeric chain through a phosphate group, $R_5$ is a carboxylic ester, a substituted amide or oxygen containing group.

3. The method of claim 2 wherein group $R_5$ is a carboxylic ester of ethylene oxide or propylene oxide of the formula:

$$-C\overset{\overset{O}{\parallel}}{\underset{O-(CH_2-\underset{\underset{R_{10}}{|}}{CH}-O\mathrm{)}_n}{}}$$

in which n has a value between 1 and 50.

4. The method of claim 3, wherein n is 1 to 10.

5. The method of claim 3, wherein $R_{10}$ is hydrogen or a methyl group.

6. The method of claim 2, wherein $R_5$ is an alkyl, aryl, or alkaryl carboxylic ester of the formula:

$$-C\overset{\overset{O}{\parallel}}{\underset{O-R_{11}-O-}{}}$$

in which $R_{11}$ has from 1 to 12 carbon atoms.

7. The method of claim 2, wherein $R_5$ is a substituted amide of the formula:

$$-C\overset{\overset{O}{\parallel}}{\underset{\underset{R_{13}-O-}{N}}{\overset{R_{12}}{}}}$$

in which $R_{12}$ is hydrogen, a $C_1$ to $C_4$ alkyl group, and $R_{13}$ is a $C_1$ to $C_4$ alkyl group.

8. The method of claim 1, wherein, when $R_5$ bonds the phosphorus atom to the polymeric chain through a phosphonate group, $R_5$ is a $C_1$ to $C_4$ alkyl group, a $C_1$ to $C_{12}$ ester, or a substituted amide.

9. The method of claim 1, wherein from 0.05 to 4% by weight of the compatibility agent is added to the suspension.

10. The method of claim 1, wherein the copolymer has a specific viscosity between 0.35 and 0.85.

11. The method of claim 10, wherein said viscosity ranges from 0.40 to 0.70.

12. The method of claim 1, wherein the copolymer is at least partly neutralized by a monovalent neutralizing agent.

13. The method of claim 12, wherein said neutralizing agent is selected from the group consisting of alkali metal containing neutralizing agents.

14. The method of claim 13, wherein said alkali metal is lithium, sodium, or potassium.

15. The method of claim 12, wherein the monovalent neutralizing agent is combined with a polyvalent neutralizing agent.

16. The method of claim 15, wherein the polyvalent neutralizing agent is an alkaline earth metal base.

17. The method of claim 16, wherein the alkaline earth metal is calcium or magnesium.

18. A method of preparing an aqueous calcium carbonate pigment suspension comprising:
stirring and slurring an aqueous suspension of calcium carbonate by first adding all or part of the copolymer of claim 1 in the aqueous phase, then an inorganic material, so as to obtain a fluid and desirably homogeneous suspension;
continuously adding said suspension to a grinding zone composed of a ball mill and maintaining the temperature during grinding below 100° C.;

grinding the pigment suspension by the action of balls for the time necessary to obtain the desired particle size distribution;

separating the suspension of the finely ground calcium carbonate from the grinding materials at discharge of the suspension from the grinder, while rejecting particles of the suspension which are too coarse; and adding an alkaline electrolyte to the finely ground suspension in concentrated form before or after optionally having formulated it for application to paper by adding various paper additives thereto, and optionally at least one other type of pigment.

19. The method of claim 18, the copolymer is added to the suspension in an amount of 0.05 to 4% by weight of active substance relative to the dry weight of the inorganic material.

20. The method of claim 19, wherein the amount of copolymer ranges from 0.5 to 2.0%.

21. The method of claim 18, which has a concentration of dry substance of at least 70% by weight.

22. The method of claim 21, wherein the concentration ranges between 74% and 80% by weight.

23. The method of claim 18, wherein additional fractions of compatibility copolymer are added to the suspension during grinding at least once.

24. A method of preparing the compatability agent of claim 1, comprising:

copolymerizing at least one (meth)acrylic acid monomer, at least one ethylenic monomer containing a phosphoric acid or phosphonic acid group and at least one dicarboxylic ethylenic monomer at atmospheric or elevated pressure in the presence of initiators and regulators in aqueous, alcoholic, aqueous alcoholic or aromatic or aliphatic hydrocarbon or halogenated solvent.

25. The method of claim 24, wherein the polymerization medium is selected from the group consisting of water, methanol, ethanol, propanol, isopropanol, the butanols, dimethylformamide, dimethyl sulfoxide, tetrahydrofuran, acetone, methyl ethyl ketone, ethyl acetate, butyl acetate, hexane, heptane, benzene, toluene, ethylbenzene, xylene, mercaptoethanol, tertio-dodecyl mercaptan, thioglycolic acid and its esters, n-dodecyl mercaptan, acetic acid, tartaric acid, lactic acid, citric acid, gluconic acid, glucoheptonic acid, 2-mercaptopropionic acid, thiodiethanol, halogenated solvents, the ethers of monopropylene glycol, and diethylene glycol.

* * * * *

UNITED STATES PATENT AND TRADEMARK OFFICE
CERTIFICATE OF CORRECTION

PATENT NO.  : 5,145,902
DATED       : September 8, 1992
INVENTOR(S) : Georges Ravet et al It is certified that error appears in the above-identified patent and that said Letters Patent is hereby corrected as shown below:

On title page, item [75], please add --Jean-Bernard Egraz, Ecully, France--.

Signed and Sealed this

Ninth Day of July, 1996

Attest:

BRUCE LEHMAN

Attesting Officer        Commissioner of Patents and Trademarks